(12) United States Patent
Obara et al.

(10) Patent No.: US 7,764,463 B2
(45) Date of Patent: Jul. 27, 2010

(54) FLUID DYNAMIC PRESSURE BEARING FOR SPINDLE MOTORS AND STORAGE DISK DRIVE DEVICES AND HAVING RIDGE PORTIONS BETWEEN GROOVES IN THE FLUID DYNAMIC PRESSURE BEARING

(75) Inventors: Rikuro Obara, Nagano (JP); Hiroshi Yoshikawa, Nagano (JP)

(73) Assignee: Minebea Co., Ltd. (JP)

( * ) Notice: Subject to any disclaimer, the term of this patent is extended or adjusted under 35 U.S.C. 154(b) by 859 days.

(21) Appl. No.: 11/596,417

(22) PCT Filed: May 13, 2005

(86) PCT No.: PCT/US2005/016844

§ 371 (c)(1),
(2), (4) Date: Nov. 9, 2006

(87) PCT Pub. No.: WO2005/117006

PCT Pub. Date: Dec. 8, 2005

(65) Prior Publication Data

US 2008/0030895 A1 Feb. 7, 2008

(30) Foreign Application Priority Data

May 20, 2004 (JP) .............................. 2004-151109
Mar. 31, 2005 (JP) .............................. 2005-103496

(51) Int. Cl.
*G11B 17/02* (2006.01)
*F16C 32/06* (2006.01)
*B21K 1/10* (2006.01)

(52) U.S. Cl. .............. 360/98.07; 360/99.08; 29/898.02; 29/898.13; 384/112

(58) Field of Classification Search .............. 360/98.07, 360/99.04, 99.08; 384/112, 120, 123; 29/898.02, 29/898.043, 898.13
See application file for complete search history.

(56) References Cited

U.S. PATENT DOCUMENTS 6,358,333 B1   3/2002   Tanaka et al.

(Continued)

FOREIGN PATENT DOCUMENTS

CN        1488043 A        7/2004

(Continued)

OTHER PUBLICATIONS

International Search Report and Written Opinion of PCT Application No. PCT/US05/016844, date of mailing Dec. 14, 2005, 10 pages total.

(Continued)

*Primary Examiner*—A. J. Heinz
(74) *Attorney, Agent, or Firm*—Townsend and Townsend and Crew LLP

(57) ABSTRACT

A fluid dynamic bearing having a shaft (12) and a bearing sleeve (11) rotatably supported relative to each other. At least one of the shaft and the bearing sleeve is made of steel or stainless steel made of by weight C: 0.6~1.20%; Si: 1.0% or less; Mn: 1.0% or less; Cr: 10.5~18.0%; Mo: 1.0% or less; S.: 0.03% or less; and Fe. The dynamic pressure bearing surface (20) is formed by ridges (22) remaining in between multiple dynamic pressure grooves (21) formed by electrochemical machining.

67 Claims, 15 Drawing Sheets

U.S. PATENT DOCUMENTS

| | | | |
|---|---|---|---|
| 6,702,408 | B1 | 3/2004 | Nagarathnam et al. |
| 7,135,797 | B2 * | 11/2006 | Khan et al. .................. 310/90 |
| 2004/0101217 | A1 | 5/2004 | Kinoshita et al. |

FOREIGN PATENT DOCUMENTS

| | | |
|---|---|---|
| CN | ZL2005-80016141 | 1/2010 |
| JP | 05-177545 | 7/1993 |
| JP | 09-137257 | 5/1997 |
| JP | 2000-213534 | 8/2000 |
| JP | 2001-298899 | 10/2001 |
| JP | 2002-048132 | 2/2002 |
| JP | 2003-214427 | 7/2003 |
| JP | 2004-188542 | 7/2004 |
| WO | WO 03/036111 A1 | 5/2003 |
| WO | WO 2005/117006 A2 | 12/2005 |

OTHER PUBLICATIONS

Office Action of CN Application No. 200580016141.1; date of mailing Jul. 7, 2008, 11 pages total.
Search Report of Malaysian Application No. PI 20052285, date of mailing Jul. 23, 2008, 3 pages total.
Office Action of Chinese Application No. 200580016141.1, dated Dec. 5, 2008, 7 pages total (English translation included).
Office Action of Chinese Application No. 200580016141.1, dated Sep. 5, 2008, 6 pages total (English translation included).

* cited by examiner

500× Electron micrograph of top ridge portion

500× Electron micrograph of top ridge portion

Surface condition after electrochemical machining

DD material before tempering

DD material after tempering

SF20T material (raw material)

DHS-1 material (raw material)

FLUID DYNAMIC PRESSURE BEARING FOR SPINDLE MOTORS AND STORAGE DISK DRIVE DEVICES AND HAVING RIDGE PORTIONS BETWEEN GROOVES IN THE FLUID DYNAMIC PRESSURE BEARING

CROSS-REFERENCE TO RELATED APPLICATIONS

This application claims all rights of priority to Japanese Patent Application No. 2004-151109 filed on May 20, 2004, (pending) and to Japanese Patent Application No. 2005-103496 filed on Mar. 31, 2005, (pending).

BACKGROUND

This invention relates to fluid dynamic bearings (also commonly referred to as "hydrodynamic bearings") utilized in spindle motors for storage disk drive devices. The invention also relates to the method of manufacture of these fluid dynamic bearings. More particularly, the invention relates to a technological improvement of dynamic pressure characteristics of fluid dynamic bearings made of steel or stainless steel. Additionally, the invention relates to significant improvements in the configuration of bearing surfaces of accurate and high precision fluid dynamic bearings. Furthermore, this invention relates to spindle motors and storage disk drive devices utilizing improved fluid dynamic bearings.

FIG. 17 shows an example of a prior art fluid dynamic bearing. The fluid dynamic pressure bearing device shown in this drawing has rotating shaft 2 rotatably supported within a cylindrical through-hole of bearing sleeve 1. The bottom opening of the cylindrical through-hole of sleeve 1 is enclosed by counter-plate 3 thus enclosing the rotating shaft inside the bearing sleeve. A disc-shaped thrust plate 4 is affixed at the bottom end of the rotating shaft 2. Multiple arcuate spiral-shaped or herringbone-shaped dynamic pressure grooves (not shown in the drawing), are formed on the lower surface of thrust plate 4 opposite to counter-plate 3. Also, multiple dynamic pressure grooves (not shown in the drawing), are similarly formed on the lower surface of the step formed within the bearing sleeve above the thrust plate. Further, multiple spiral-shaped or herringbone-shaped dynamic pressure grooves 18 are formed on the inner circumferential surface of bearing sleeve 1. The bearing gap formed between the fixed bearing sleeve with the counter-plate and the rotating shaft with the thrust plate is filled with lubricating oil.

In recent years, there have been an upsurge in requirements for miniaturization, reduction in weight, and thinner profiles of hard disk drives, which are typical disk drive storage devices. At the same time, as the storage capacity of hard disks has increased, there was a growing demand for increased surface density. Therefore, a significant amount of research has been done on widely-used fluid dynamic bearings that resulted in a significant increase in utilization of fluid dynamic bearings for spindle motors in hard disk drives. The research concentrated in the area of forming more accurate and highly-precise dynamic pressure grooves as a way to accurately and efficiently generate dynamic pressure.

Electrochemical machining is currently known as a method for forming dynamic pressure grooves. However, when this method is used on a bearing sleeve made of sulphur free-cutting alloy steel having good machining properties, it is difficult to use electrochemical machining to dissolve and form multiple dynamic pressure grooves. It is also difficult to obtain the desired degree of accuracy and high-precision in the shape of ridges remaining between the dynamic pressure grooves. FIG. 3A shows that, when the surface of each dynamic pressure groove is viewed in cross-section, corner portion 24 connecting top portion 22 and sloped wall 23 of each ridge is rounded. This is the result of the disparity between dissolution characteristics of the sulfide inclusions comprising the free-cutting components, which are contained in the sulphur free-cutting alloy steel, and dissolution characteristics of the Fe, which is the principle component of the metal, during the electrochemical machining process. Additionally, the rounding of the corner portion is the result of dislodging and cracking of the sulfide inclusions exposed on the electrochemically machined surface.

It is important to optimize dynamic pressure efficiency (dynamic pressure/axial torque loss), in order to create dynamic pressure more accurately and efficiently. In FIG. 3B, it is preferable that the ridge-groove ratio is as follows:

$$\frac{\text{dynamic pressure groove width, } Bv}{\text{width of top portion, } B1} = 1.0 \sim 1.3 \quad (1)$$

Additionally, it is also preferable that the groove depth ratio is as follows:

$$\frac{\text{distance from the surface opposite the dynamic pressure groove to the bottom of the groove, } h0}{\text{depth of groove, } hg} = 2.1 \sim 2.3 \quad (2)$$

It is difficult, however, to achieve (1) and (2) in mass production due to the reasons outlined above.

There are other problems caused by insolubility and dislodging of sulfide inclusions. Surfaces that are finished by milling and surfaces finished by electrochemical machining have problems of irregular surfaces due to dislodging and insolubility, thus aggravating surface roughness. Additional problems are caused when sulfide inclusions, which are exposed on the machined surface or dislodged from the surface, build up, and become lodged in between the shaft body and the bearing part.

As a result of these problems, bearing rigidity in fluid dynamic bearings declines and axial torque loss increases so that the rotational precision and service life of spindle motors for storage disk drive devices declines, power consumption and starting times increase, leading to significant problems for storage disk drive devices, especially given the trend toward miniaturization and a slimmer profile.

Methods disclosed in, for example, Japanese Laid-Open Patent Publication 2001-298899 and Japanese Laid-Open Patent Publication 2002-119584 have been utilized to prevent dislodging of sulfide inclusions. The above references propose the removal of sulfide inclusions using acids and alkalis after machining the parts. However, these removal methods present an impediment to the reduction of manufacturing costs by adding complexity to the manufacturing process. Handling of acids and alkalis is hazardous and represents a danger to the environment. Additionally, the disclosed methods offer no solution for improvement in the accuracy and high-precision of the surface configuration of fluid dynamic bearings. Moreover, the use of acids and alkalis to remove sulfide inclusions ends up dissolving the matrix as well, and has the defect of rounding the corner portions of the ridges as well.

SUMMARY

In light of the prior art problems described above, it is an object of the present invention to provide a fluid dynamic bearing optimizing dynamic pressure efficiency by an accurate and highly-precise surface configuration with little surface roughness. It is another object of the present invention to prevent dislodging of sulfide inclusions, making it possible to consistently maintain high bearing rigidity and little axial torque loss over long periods of time, without necessitating complex steps in manufacturing, eliminating the hazard of handling acids and alkalis, and reducing the danger to the environment.

In one of its general aspects, the present invention is a fluid dynamic bearing having a shaft and a bearing sleeve rotatably supported relative to each other. In accordance with the invention, at least one of the shaft and the bearing part is made of steel or stainless steel made of by weight C: 0.6~1.20%; Si: 1.0% or less; Mn: 1.0% or less; Cr: 10.5~18.0%; Mo: 1.0% or less; S: 0.03% or less; and Fe. The ridges remaining in between multiple dynamic pressure grooves formed by electrochemical machining comprise a dynamic pressure bearing surface.

Since the sulphur content in material for the parts having dynamic pressure grooves in this invention is kept to 0.03% or less and there are extremely few sulfide inclusions, there is no unevenness in the surfaces finished by milling or the surfaces finished by electrochemical machining. Therefore, it is possible not only to improve surface roughness and to easily shape the dynamic pressure bearing surface accurately with a high degree of precision, but also to provide a fluid dynamic pressure bearing that maintains stable and high bearing rigidity over long periods of time as well as maintaining low axial torque loss. Moreover, there is no need for the complex, hazardous and environmentally unsound work involving the use of acids or alkalis to clean parts having dynamic pressure bearing surfaces such as these, thereby facilitating ease of manufacture. Furthermore, this invention does not have the problem of the prior art wherein the use of acids are alkalis in the removal of sulfide inclusions would cause dissolution of the matrix, thereby rounding the corner portions of the ridges.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

The following is a description of a preferred embodiment of the invention. In this invention, at least one of either the shaft or, the bearing part preferably has a Pb content of under 0.001% by weight. The reason for this is as follows.

Although the problems caused by insolubility and the dislodging of sulfide inclusions have already been discussed, the soluble constituents also cause significant problems. Since there are variations in machining speed due to the differences in the ease of elution of different types of metals in electrochemical machining, uniform removal of material may not take place. Faraday's law, as shown in Equation 1, below, is used to calculate the amount of material removed by electrochemical machining.

$$M = \eta Z I t \quad \text{Equation 1}$$

Wherein:
M is the amount of material, in grams, removed by electrolysis;
Z is the electrochemical equivalent (g/C);
I is the pass through current (A);
t is the pass through time (s);
$\eta$ is the current efficiency.

Equation 2 is used to find the volume of metal material removed by electrochemical machining having a density $\rho$.

$$V = M/\rho \quad \text{Equation 2}$$

Therefore:

$$V = \eta Z I t / \rho$$

Thus, the volume of material removed per unit of time, i.e., the speed of electrochemical machining, is expressed by Equation 3, below. In Equation 3, $K = Z/\rho$ is the electrolytic constant, and the volume machining speed is in direct proportion to the electrolytic constant when machining parameters (passed through current and current efficiency), are constant.

$$v = V/t$$

$$v = \eta Z I / \rho$$

$$v = \eta K I \quad \text{Equation 3}$$

Figure 10:
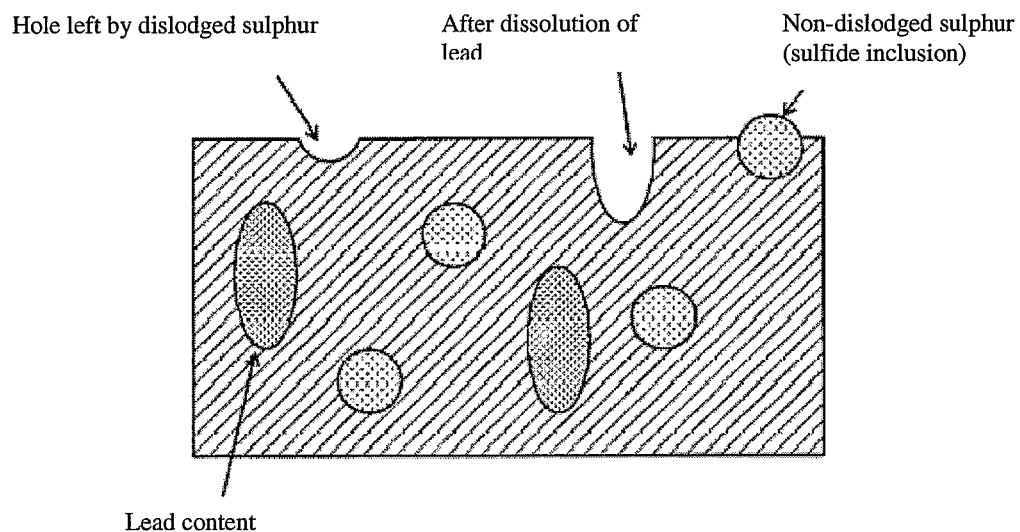
FIG. 10 shows a schematic diagram illustrating the behavior of the sulphur and lead components in electrochemical machining.

Table 1 shows the electrolytic constants for the principal chemical elements contained in stainless steel. The larger the electrolytic constant the higher the volume machining speed in electrochemical machining. As indicated in Table 1 below, the lead (Pb) component in metal has the largest electrolytic constant. The lead component dissolves and is removed faster than other metals. In contrast, the negatively-charged sulphur (S) component does not dissolve and, as the surrounding matrix is dissolved, sulfur component is dislodged and removed. The lead component has a machining speed of two times or greater than that of other metals, and as a result the lead component is more quickly machined, leaving depressions in the surface where it had been dissolved. On the other hand, the sulphur component that is not dislodged leaves bumps in the surface in the form of sulfide inclusions that project from the surface. FIG. 10 is a schematic drawing showing that condition. As shown in FIG. 10, a surface that had been smoothed prior to electrochemical machining has depressions in the surface after electrochemical machining, causing a deterioration in the surface roughness of the machined surface. In the preferred embodiment of the present invention, the lead content is less than 0.001% by weight for this reason, and this is one of the conditions necessary to ensure that surface roughness is Ra 0.1 μm or less.

TABLE 1

| | Element name | | | | | | | | | |
|---|---|---|---|---|---|---|---|---|---|---|
| | Fe | C | Si | Mn | P | S | Cr | Mo | V | Pb |
| Electrolytic constant | Bivalent: 0.037 Trivalent: 0.025 | 0.124 | 0.042 | Bivalent: 0.038 Trivalent: 0.026 Quadrivalent: 0.019 | Bivalent: 0.088 Trivalent: 0.058 Hexivalent: 0.029 | Note 1 | Bivalent: 0.038 Trivalent: 0.025 | Bivalent: 0.049 Quadrivalent: 0.024 | Bivalent: 0.045 Trivalent: 0.030 Hexivalent: 0.015 | 0.095 |

Note 1: Does not dissolve in electrochemical machining because sulphur has a negative charge.

Next, in a fluid dynamic bearing provided with a shaft and a bearing part rotatably supported relative to each other, the present invention provides a manufacturing method for a fluid dynamic bearing wherein at least one of the shaft and the bearing part is made of steel or stainless steel comprising by weight C: 0.6~1.20%; Si: 1.0% or less; Mn: 1.0% or less; Cr: 10.5~18.0%; Mo: 1.0% or less; S: 0.03% or less; Pb: less than 0.001%, and Fe. In this steel the eutectic carbon particles are 10 μm or less in diameter, and the steel or stainless steel undergoes heat treatment that includes tempering and annealing. The electrochemical machining is performed after polishing so that top ridge portions remain intact as the bearing surface between multiple dynamic pressure grooves formed by electrochemical machining.

Studies performed by the inventors have determined that the better the surface roughness of the surface prior to machining, the better the surface roughness of the machined surface after electrochemical machining. There are very few sulfide inclusions in the steels or stainless steels defined by the method of manufacture of the fluid dynamic bearing of the present invention because these steels have small diameter eutectic carbides, and sulphur content is restricted to very low levels. Moreover, since there is almost no lead, the metal structure becomes finer and more homogeneous through the hardening heat treatment. Thus, tearing off of the material or dislodging of certain constituents from the material surface are prevented during grinding or polishing subsequent to heat treatment, and the surface roughness prior to electrochemical machining is markedly improved. For example, the surface roughness of top ridge portions achieved after electrochemical machining is Ra 0.1 μm or less.

When the resulting bearing surface is viewed in cross-section, it is clearly visible that the resulting dynamic pressure generating grooves are formed by substantially straight top ridge portions, substantially straight sloped walls and substantially straight bottom portions. Top ridge portions and sloped walls are joined by a roughly arcuate corner portions. The length of the corner in direction parallel to substantially straight top ridge portion, i.e., length M in FIG. 3B, is preferably 20 μm or less, and length of the corner in direction parallel to substantially straight sloped wall, i.e., length L in FIG. 3B, is preferably 1.0 μm or less.

Additionally, when the bearing surface is viewed in cross-section, the length of each sloped wall is preferably 75-90% of the length of an imaginary line segment obtained by cutting a straight line tangential to sloped wall with a straight line tangential to the straight top ridge portion and a parallel straight line tangential to the deepest point of the bottom groove portion.

In the preferred embodiments of this invention, the surface roughness of the top ridge portions is Ra 0.1 μm or less. Moreover, the variation in the depth of dynamic pressure generating grooves is preferably 0.4 μm or less.

The following is a description of a suitable constitution of the fluid dynamic bearing of this invention, with reference to the drawings.

Figure 1:
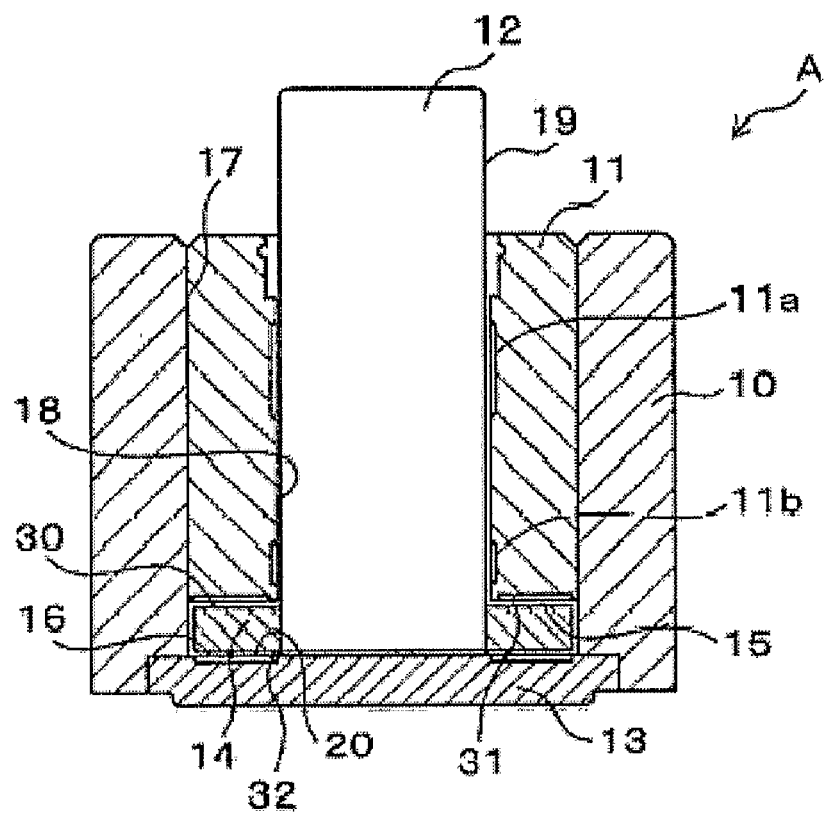
FIG. 1 shows a cross-section view of an embodiment of the fluid dynamic bearing in accordance with the present invention.

FIG. 1 is a cross-sectional view of an embodiment of the fluid dynamic bearing of this invention. As shown in FIG. 1, the fluid dynamic bearing has a shaft 12, a cylindrical case 10 and a tubular bearing sleeve 11 fitted into the cylindrical case 10 along the cylindrical inner surface 17. Shaft 12 and bearing sleeve 11 are rotatably supported relative to each other. Thrust plate 14 is fixedly fitted onto one end of shaft 12 (the bottom portion in FIG. 1). A disk-shaped end plate 13 encloses the bottom end of case 10 such that thrust plate 14 is positioned between the top surface 16 of the end plate and the bottom surface 15 of bearing sleeve 11.

Radial dynamic pressure bearing surfaces 11a, 11b are formed on the inner peripheral surface 18 of the bearing sleeve 11 in opposing relationship with the outer peripheral surface 19 of shaft 12. Radial bearing surfaces 11a and 11b sustain the load in the radial direction. Axial dynamic pressure bearing surfaces 31 are formed at the bottom surface 15 of bearing sleeve 11 in opposing relationship with the top surface 30 of thrust plate 14 to generate dynamic pressure and to sustain the load in the axial direction. Additional axial dynamic pressure bearing surfaces 20 are formed at the upper surface 16 of end plate 13 in opposing relationship with the bottom surface 32 of thrust plate 14 to generate additional dynamic pressure and sustain additional load in the axial direction. These dynamic pressure bearing surfaces 11a, 11b, 20, and 31 are not necessarily limited to the herringbone shape of dynamic pressure grooves. They may be dynamic pressure grooves formed in spiral, arcuate, straight, or other shapes. The minute gaps formed between the dynamic pressure bearing surfaces 11a, 11b, 20, and 31 and their opposing surfaces are filled with lubricating oil.

The material used for bearing sleeve 11 and end plate 13 is steel or stainless steel comprising by weight C: 0.6~1.2%; Si: 1.0% or less; Mn: 1.0% or less; Cr: 10.5~18.0%; Mo: 1.0% or less; S: 0.03% or less; and Fe. After this material is heat treated and polished, dynamic pressure generating bearing surfaces are formed by electrochemical machining such that each surface comprises multiple top ridge portions between multiple herringbone-shaped dynamic pressure grooves, as shown for example in FIG. 2.

As shown in the cross-sectional view of FIG. 3, top ridge portions 22 are formed substantially straight. Each dynamic pressure groove 21 has two substantially straight sloped walls 23 and a bottom portion. Sloped walls 23 and top ridge portions 22 are connected by approximately arcuate corner parts 24. The length M of the corner portion 24 in direction parallel to substantially straight top ridge portion 22 is 20 μm or less. The length L of the corner portion 24 in direction parallel to substantially straight sloped wall 23 is 1.0 μm or less. The length B of each sloped wall 23 is preferably 75-90% of the length of the line segment A obtained by cutting a straight line tangential to sloped wall 23 with parallel straight lines tangent to the straight top ridge portion 22 and to the deepest part of the bottom of the dynamic pressure groove.

Electrochemical machining is used to form dynamic pressure grooves on the surface of the finish-ground bearing surface, so that the surface roughness of top ridge portions is Ra 0.1 μm or less, and the variation in depth of the dynamic pressure grooves between the grooves is 0.4 μm or less. In this way, a fluid dynamic bearing is obtained having the desired efficiency of dynamic pressure characteristics as well as stable, long-term reliability.

Bearing sleeve 11 and end plate 13 manufactured in accordance with the above described method from steel or stainless steel have very few sulfide inclusions exposed or projecting from the machined surface. Therefore, there is no need to remove such inclusions using acids or alkalis, thus making it possible to reduce manufacturing costs and to eliminate the hazards and environmental risks associated with acids or alkalis. Moreover, the tempering temperature of the heat treatment is selected such that the bearing parts are tempered to a high hardness. Therefore, the bearing parts are unlikely to be rendered defective due to scratches or deformation during the assembly process. These parts are also unlikely to be damaged from wear as a result of loading due to starting, stopping, vibration, or impact experienced in use as bearing devices. Also, while the prior art suffered from the defect of rounding of the corner parts due to the technique of removing sulfide inclusions with acids are alkalis, this problem does not occur in the fluid dynamic pressure bearing device described above.

Figure 11:
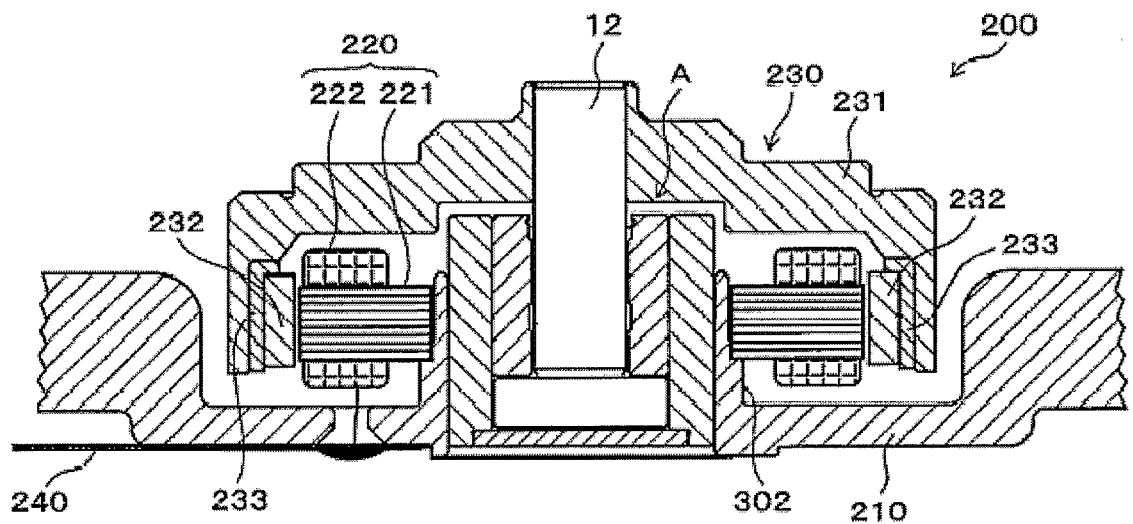
FIG. 11 shows a cross-sectional view of the spindle motor constructed in accordance with one embodiment of the present invention.

FIG. 11 is a cross-sectional view showing a schematic constitution of a spindle motor 200 using a heat treated version of the fluid dynamic bearing A shown in FIG. 1 that has been heat treated in accordance with the process described below in Embodiment 2. The fluid dynamic bearing A is manufactured as in Embodiment 2, described below. Note that the spindle motor 200 is not limited to the fluid dynamic bearing of Embodiment 2, and can be applied to a variety of bearing embodiments within the scope of the present invention.

Spindle motor 200 is provided with a base 210 that is also a part of the casing of the hard disk drive. Boss part 302 is formed at the bottom of the base 210 and projects above the base. Stator 220 consisting of a stator core 221 and a coil 222 wrapped about the core is affixed to the outer surface of the boss part. The fluid dynamic bearing A (equivalent to the one shown in FIG. 1) is fitted into the inner peripheral surface of boss part 302. Rotor 230 is supported by the fluid dynamic bearing A so that it moves rotatably relative to stator 220. Rotor 230 has a rotor hub 231 that is fitted to the upper end of shaft 12, and a rotor magnet 232 that is fitted to the tubular inner perimeter surface of the rotor hub 231 through a yoke 233. Rotor magnet 232 functions with the stator 220 to generate a rotating magnetic field. When the fluid dynamic bearing A is fitted to the inner peripheral surface of boss part 302, it is preferable that thermosetting or other type of adhesive is used for fixing so that there are no gaps formed between the two parts. The spindle motor described above need not be limited to the outer rotor type motor constitution described above, and inner rotor type motors may also be utilized.

A screw hole (not shown in the drawing) facing in the axial direction is formed in the center of the upper surface of shaft 12, and a clamp (not shown in the drawing) is mounted using this screw hole in order to affix the hard disk. Flexible wiring board 240 is mounted on the bottom surface of base 210, and the rotor assembly comprising the rotor magnet 232 and shaft 12 rotates relative to the stator 220 by supplying control current to the stator 220 from the output end of this flexible wiring board 240.

In spindle motor 200 comprising the fluid dynamic bearing A of Embodiment 2, the rotor 230 is held in a stable position without floating up or sinking down when the shaft is rotating by balancing the axial dynamic pressure forces in the up and down direction that is generated by the thrust dynamic pressure generating grooves of the fluid dynamic bearing A.

In spindle motor 200 of the above-described embodiment, the high-precision bearing surface configuration makes it possible to have a high bearing rigidity despite its small size and slim profile. Further, the preferred construction results in low axial torque loss affording low power consumption. Moreover, manufacturing costs can be reduced. Additionally, reliability can be maintained over long periods of use because the bearing surface of the spindle motor 200 has very few exposed or projecting sulfide inclusions and is provided with a high degree of hardness by appropriate heat treatment.

Figure 12:
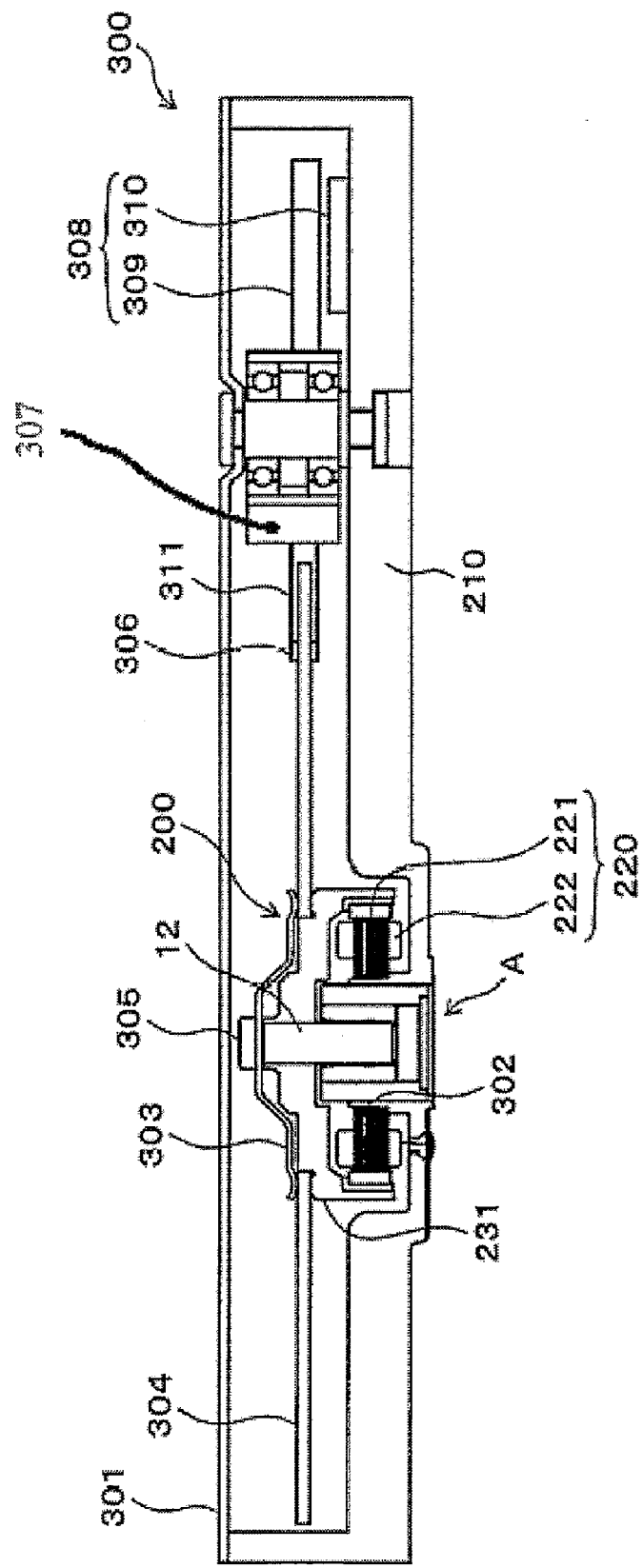
FIG. 12 shows a cross-sectional view of a hard disk drive device constructed in accordance with the present invention.

FIG. 12 is a cross-sectional view of a schematic constitution of a hard disk drive device (storage disk drive device) 300 using spindle motor 200 shown in FIG. 11. Cover 301 is provided in this hard disk drive device 300 to seal the inside of base 210 of the spindle motor 200 shown in FIG. 11, forming a clean chamber with extremely little dirt or dust. The casing of hard disk drive device 300 comprises the cover 301 and the base 210. Therefore, the base 210 constitutes a part of the spindle motor 200 while also serving as a part of the casing of the hard disk drive device 300. In this way, the main part of the spindle motor, including the spindle motor stator and rotor, is housed within the casing of the hard disk drive device 300.

One layer of the hard disk (storage disk) 304 is mounted on the outside peripheral surface of rotor hub 231. Hard disk 304 is affixed to the rotor hub 231 by installing clamp 303 and securing the clamp by screwing a center pin 305 into the screw hole of the upper end of the rotating shaft. Therefore, hard disk 304 rotates as a unitary component with rotor hub 231. In this embodiment, one hard disk 304 is installed on the rotor hub 231, however, there is no restriction on the number of hard disks that can be installed on the rotor hub.

Hard disk drive device 300 is provided with a magnetic head 306 that implements writing and reading of data to/from the hard disk 304. The magnetic head is supported by an arm 307 and is provided with a voice coil motor 308, which moves the magnetic head 306 and arm 307 to the desired position. Voice coil motor 308 has a coil 309 and a magnet 310 disposed in an opposing relationship to the coil 309.

Magnetic head 306 is installed at the end of a head stack assembly 311 supported in a way allowing it to pivot freely from the proper location on the base 210. Magnetic head 306 is typically constructed as a pair of heads, one of which is disposed above the hard disk 304 and the other is disposed below the hard disk. Thus, the hard disk is positioned between the two heads which can read and write data to and from both sides of the hard disk 304. Note that this embodiment is constituted with a single hard disk 304, so there is one magnetic head set 306. However, there is no limitation on the number of layers of hard disks 304, and magnetic head pairs that may be provided for each constituent disk layer.

Thus, by using spindle motor 200 shown in FIG. 11, hard disk drive device 300 of this embodiment offers high bearing rigidity in a small and slim profile due to the use of a high-precision bearing surface configuration, offering little axial torque loss and lower power consumption, and reducing manufacturing costs. Although this embodiment of the invention is described as applied to a hard disk drive device, it may also be applied to storage disk drive devices processing CDs, DVDs, etc., with an optical head.

Additionally, although the aforementioned embodiment describes an example of a storage disk drive device 300 provided with a rotating shaft-type fluid dynamic bearing A, and a spindle motor 200 provided for this fluid dynamic bearing A, the fluid dynamic bearing of this invention may also be applied to fixed shaft-type spindle motors.

Figure 13:
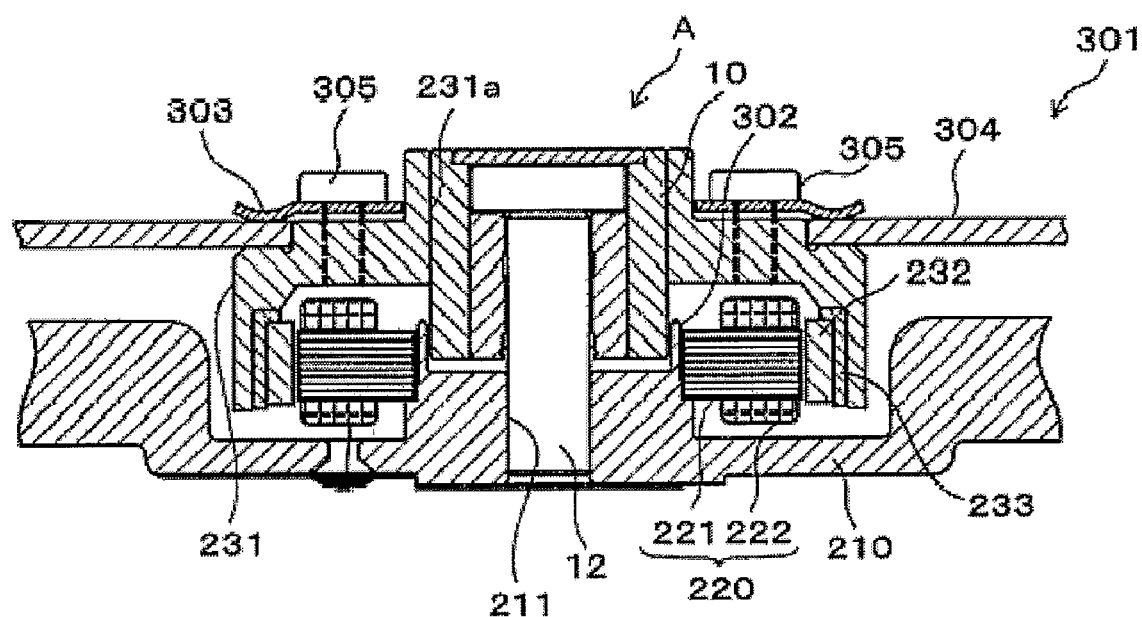
FIG. 13 shows a cross-sectional view of the spindle motor constructed in accordance with another embodiment of the present invention.

FIG. 13 shows the main part of the fixed shaft-type spindle motor for a hard disk drive device 301. In the following explanation, the spindle motor has the same constituent elements as spindle motor 200 and its constituent elements shown in FIGS. 11 and 12, so an explanation of the same symbols will be omitted. As shown in FIG. 13, shaft 12 of the fluid dynamic bearing A is press-fitted into the installation hole 211 formed in the base 210. Cylindrical case 10 of the fluid dynamic bearing A is pressure fitted into the installation hole 231a formed in the rotor hub 231. Clamp 303 are installed on the top surface of rotor hub 231 by means of the center pin 305, and the hard disk 304 is secured on the rotor hub 231 by clamps 303. The hard disk drive device 301 thus constituted operates and has the same effect as the hard disk drive device 300 shown in FIG. 12. Note that in this embodiment, the disposition of the rotor is the same outer type as shown in FIG. 12, but an inner type is also possible.

Embodiment 1

Figure 2:
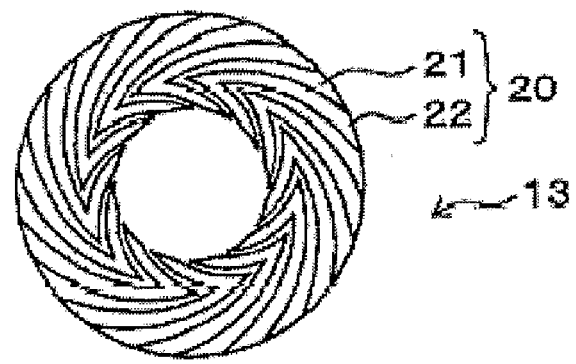
FIG. 2 shows a plan view of the end plate 13 used in the embodiment shown in FIG. 1.

A martensitic stainless steel disk blank comprising by weight of C: 0.6~1.20%; Si: 1.0% or less; Mn: 1.0% or less; Cr: 10.5~18.0%; Mo: 1.0% or less; S: 0.03% or less; and Fe was produced by turning. Next, after polishing the blank on both sides and on the outside perimeter, electrochemical machining was used on one side of this blank to form a dynamic pressure bearing surface 20 including herringbone-shaped dynamic pressure generating grooves 21 and top ridge portions 22 remaining between the grooves, as shown in FIG. 2. As a result, the end plate 13 having the dynamic bearing surface 20 is produced.

Similarly, a tubular blank of the aforesaid martensitic stainless steel was turned, and then polished at both ends, the outer peripheral surface and inner peripheral surface. Next, electrochemical machining was used on one end side of this blank to form the dynamic pressure bearing surface 20 comprising multiple herringbone-shaped dynamic pressure grooves 21 and top ridge portions 22 remaining between the grooves, as shown in FIG. 2. Also, electrochemical machining was used on sections of the inner peripheral surface of the tubular blank to form dynamic pressure bearing surfaces 11a and 11b (see FIG. 1) similarly comprising multiple herringbone-shaped dynamic pressure grooves and straight top ridge portions remaining between the grooves.

Embodiment 2

In accordance with the second embodiment of the invention, the end plate and the bearing sleeve were first produced under the same conditions as in the Embodiment 1. However, after the turning, the blank was hardened and annealed to Rockwell hardness of HRC 58~62 before polishing and electrochemically machining the blanks to form dynamic pressure generating grooves 21.

COMPARATIVE EXAMPLE

Sulphur free-cutting alloy steel (SUS 430F) with a composition by weight of C: 0.05% or less; Si: 1.0% or less; Mn: 2.0% or less, Cr: 19~21%; Mo 1.5~2.5%; P: 0.05%; S: 0.10%~0.15%; Pb: 0.1~0.3%; with the remainder Fe and unavoidable impurities, was used to produce an end plate and a bearing sleeve using the process described in the Embodiment 1, above.

Evaluation

1. General Observations.

Figure 5A:
FIG. 5A shows a photograph of the dynamic pressure generating grooves manufactured in accordance with the first embodiment of the present invention.
Figure 5B:
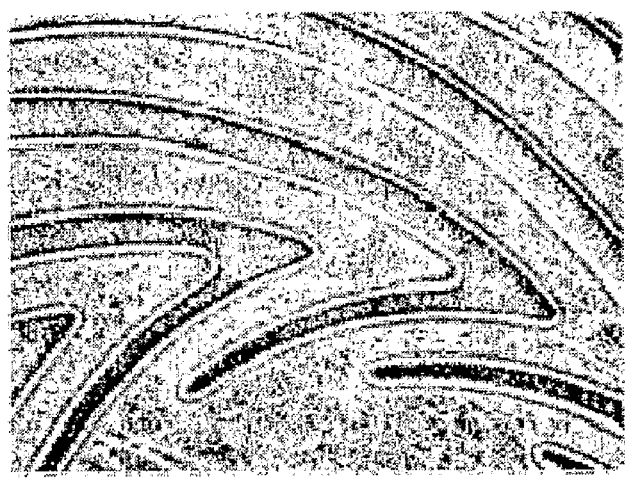
FIG. 5B shows a photograph of the dynamic pressure generating grooves manufactured in accordance with the second embodiment of the present invention.
Figure 5C:
FIG. 5C shows a photograph of the dynamic pressure generating grooves manufactured in accordance with a comparative example.
Figure 6A:
FIGS. 6A and 6B show enlarged photographs of the dynamic pressure generating groove of the first embodiment of the present invention.
Figure 6B:
Figure 7A:
FIGS. 7A and 7B show enlarged photographs of the dynamic pressure generating groove of the second embodiment of the present invention.
Figure 7B:
Figure 8A:
FIGS. 8A and 8B show enlarged photographs of the dynamic pressure generating groove of the comparative example.
Figure 8B:
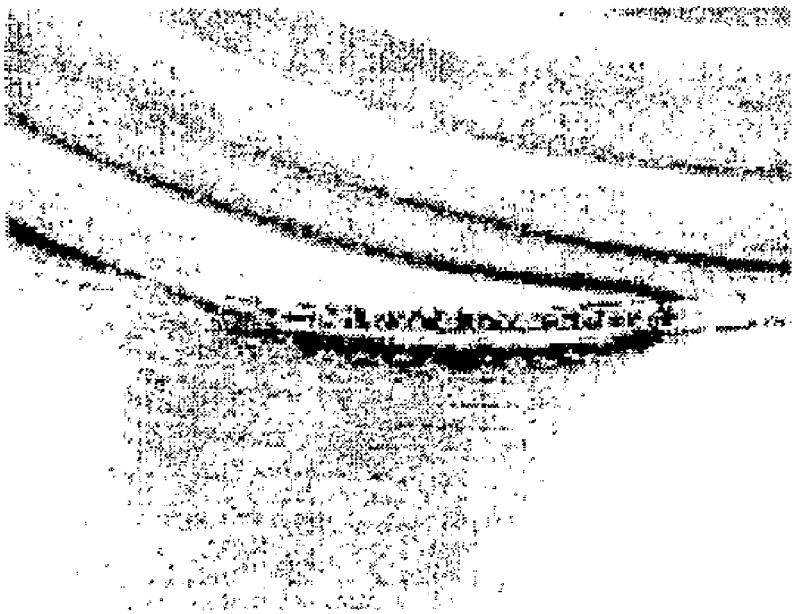

FIGS. 5A-5C are photographs showing dynamic pressure bearing surfaces of Embodiments 1, 2, and the comparative example. FIG. 6A, FIG. 7A, and FIG. 8A are enlargements of these dynamic pressure generating grooves. Further, FIG. 6B, FIG. 7B, and FIG. 8B are photographic enlargements of oblique views of the dynamic pressure surfaces. The photographs in FIGS. 6, 7, and 8 correspond to Embodiments 1, 2 and the comparative example, respectively.

Figure 9A:
FIGS. 9A and 9B show electronic micrographs of the top ridge portion of the dynamic pressure generating groove of the comparative example and the second embodiment of the present invention, respectively.
Figure 9B:
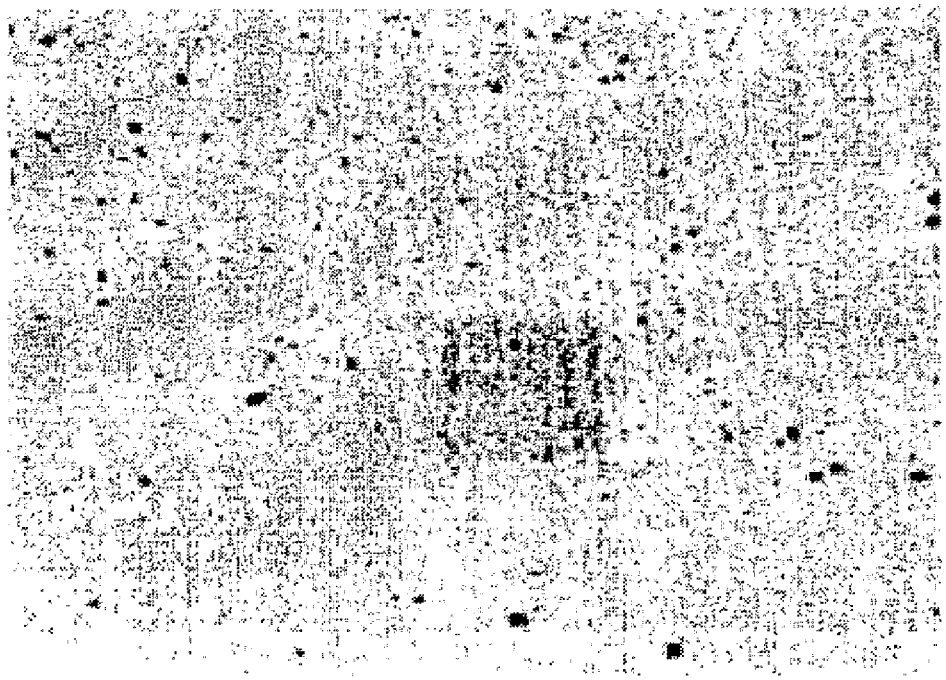

FIGS. 9A and 9B are electronic micrographs of the top ridges portions of the dynamic pressure bearing surface formed on the end surface of the bearing sleeve in the comparative example and Embodiment 2, respectively.

2. Dynamic Pressure Groove Profile.

Figure 4A:
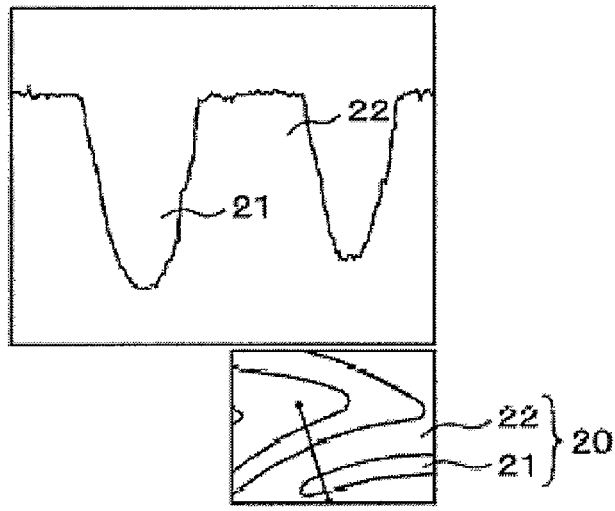
FIG. 4A shows the profile of the dynamic pressure generating grooves manufactured in accordance with the first embodiment of the present invention.
Figure 4B:
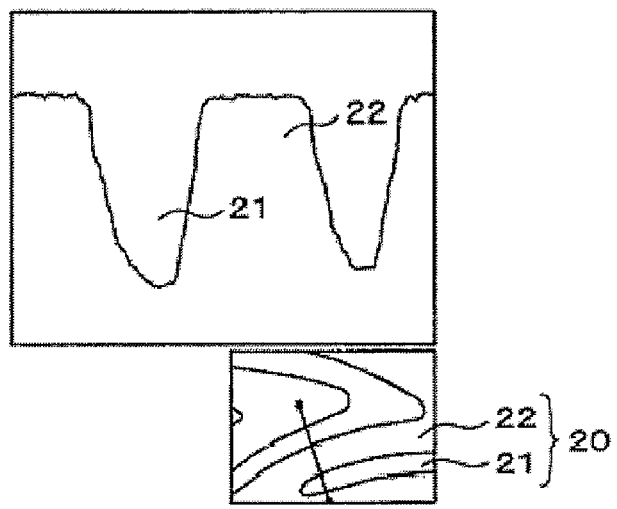
FIG. 4B shows the profile of the dynamic pressure generating grooves manufactured in accordance with the second embodiment of the present invention.
Figure 4C:
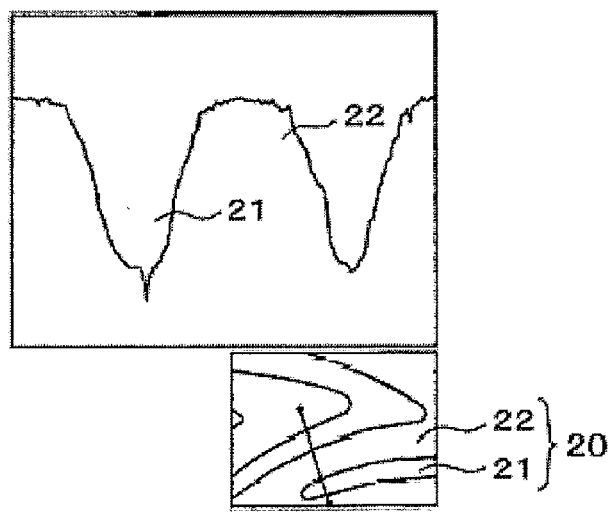
FIG. 4C shows the profile of the dynamic pressure generating grooves manufactured in accordance with a comparative example.

Using a surface measurement device (Surface Explorer, made by Ryoka Systems Inc.), profiles were taken in the direction perpendicular to the dynamic generating groove direction on the fluid dynamic bearing surface 20 of Embodiments 1, 2, and the comparative example. Results are shown in FIGS. 4A-4C, respectively.

3. Measurements were taken of the rounding dimensions of the corner portions connecting the top ridge portions and the sloped walls, in FIGS. 4A-4C, and of the maximum rounding dimension in the horizontal direction (M) and the vertical direction (L), in FIG. 3B.

4. Surface Roughness

The surface roughness Ra of the top ridge portions and the surface roughness Ra of the bottom portions of the dynamic pressure grooves were measured, and the variation between the maximum and minimum values for the depth of dynamic pressure generating grooves were calculated.

5. Shape of the Dynamic Pressure Groove, Etc.

Observations were made of the shape of the dynamic pressure grooves, corner portions shape, and the degree of bottom irregularity of the dynamic pressure grooves. Results are shown in Table 2.

6. Sloped Walls of the Dynamic Pressure Groove.

Figure 3A:
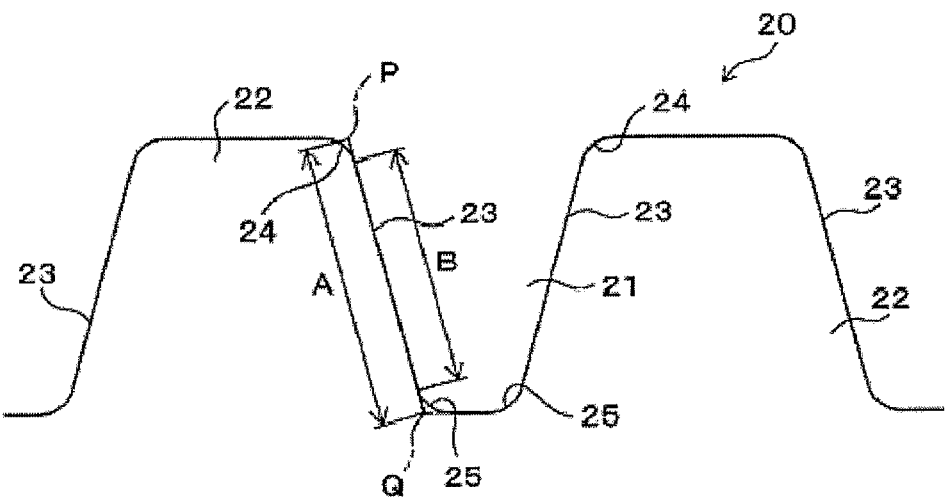
FIGS. 3A and 3B show a partial cross-section view of the dynamic pressure generating grooves.
Figure 3B:
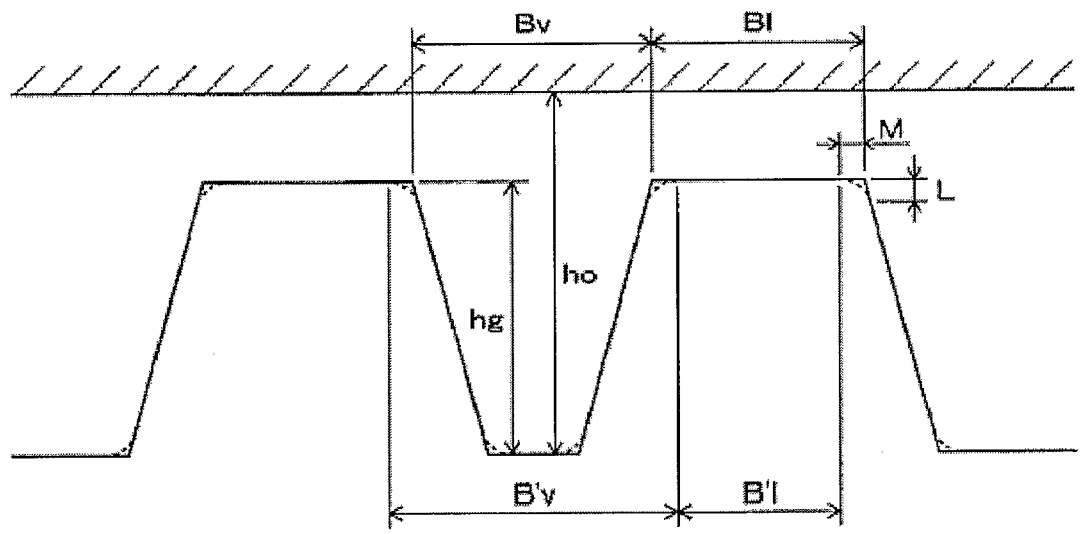

The ratio between the straight portion and the entire length of each sloped side of the dynamic pressure grooves, i.e., B/A (%) in FIG. 3A, was calculated. Results are shown in Table 3.

TABLE 2

| Item | Embodiment 1 | Embodiment 2 | Comparative example |
|---|---|---|---|
| surface roughness of top ridge portion (Ra μm) | 0.07 | 0.05 | 0.11 |
| Max. rounding dimension, top ridge portion direction (μm) | 17 | 17 | 37 |
| Max. rounding dimension, groove depth direction (μm) | 0.7 | 1.0 | 1.3 |

TABLE 2-continued

| Item | Embodiment 1 | Embodiment 2 | Comparative example |
|---|---|---|---|
| Surface roughness of the dynamic groove bottom (Ra μm) | 0.10 | 0.15 | 0.20 |
| Dynamic groove depth variation (μm) | 0.23 | 0.30 | 0.42 |
| Dynamic groove shape Arcuate shape of the dynamic pressure groove corner portion | No deviation Small arc | Deviation Small arc | Deviation Large arc |
| Irregularity condition of the bottom of the groove | No irregularity | No irregularity | Irregularity |

TABLE 3

| | Embodiment 1 | | Embodiment 2 | | Comparative example | |
|---|---|---|---|---|---|---|
| | Left sloped surface | Right sloped surface | Left sloped surface | Right sloped surface | Left sloped surface | Right sloped surface |
| Location 1 | 83.0 | 77.9 | 73.3 | 76.7 | 69.0 | 68.9 |
| Location 2 | 92.0 | 76.8 | 73.5 | 69.9 | 77.0 | 70.6 |
| Location 3 | 85.6 | 80.9 | 64.4 | 78.6 | 83.3 | 67.6 |
| Location 4 | 80.0 | 79.1 | 83.2 | 93.8 | 70.4 | 68.1 |
| Average | 85.2 | 78.7 | 73.6 | 79.7 | 74.9 | 68.8 |
| Overall Average | 81.9 | | 76.7 | | 71.9 | |

As is apparent from FIG. 6A and FIG. 7A, the bottom portions of dynamic pressure grooves formed by electrochemical machining in accordance with the present invention are flat and have almost no irregular shape in the Embodiment 1, as shown in FIG. 6A, and in the Embodiment 2, as shown in FIG. 7A. This configuration of the bottom portions as a flow path for lubricating oil in a fluid bearing device reduces flow resistance and turbulent flow, thus permitting the reduction of axial torque loss and the efficient generation of dynamic pressure. On the other hand, there is a remarkable amount of irregularity in the shape shown in FIG. 8A (Comparative Example), and this would be apt to present flow resistance and generate turbulent flow as a flow path for lubricating oil in a fluid bearing device, and would also tend to increase axial torque loss.

FIGS. 9A and 9B are electronic micrographs of the top ridge portions of the Comparative Example and Embodiment 2, respectively. As shown in FIG. 9A, there are large sulfide inclusions (having an outer diameter in excess of 10 μm), which may result in residual protrusions or may become dislodged, leaving pits in the surface. On the other hand, there are very few small sulfide inclusions in FIG. 9B (having an outer diameter of less than 1 μm), and the matrix is very fine-grained and homogeneous so that there are no problems whatsoever regarding dimension or shape. These observational results correlate with the values for dynamic groove bottom surface roughness shown in Table 2.

As is apparent from FIG. 4, although there were no irregularities in the bottom portions of the dynamic pressure grooves of Embodiments 1 and 2, there was a substantial irregularity in the Comparative Example. As was discussed above, irregularities in the flow path of lubricating oil are apt to cause flow resistance or turbulent flow, and may also result in an increase in axial torque loss. Moreover, the rounded corner portion is small and forms a sharp edge in Embodiments 1 and 2, while in the Comparative Example the rounded corner portions are large. As a result, by utilizing the present invention, the straight top ridge portions of the dynamic grooves are formed so that they are extremely close to their maximum possible dimension, as shown in Table 3, obtaining the desired ratio between ridges and grooves. On the other hand, in the comparative example, the dimensions of the top ridge portions are small and, as a result, the ratio between ridges and grooves is significantly smaller than the desired value. Therefore, it was confirmed that in the present invention excellent dynamic groove shape was obtained with the desired ridge to groove ratio.

As shown in Table 2, the values for top ridges portions' surface roughness, corner portions (edges), dynamic pressure groove bottom surface roughness, and the variation in dynamic pressure groove depth are all small. Therefore, the bearing surface configuration after the polishing and electrochemical machining is accurate and highly precise, the desired ridge-groove ratio is obtained, and a superior fluid dynamic bearing that efficiently generates dynamic pressure is obtained.

Embodiment 3

Stainless steel disks of the three compositions indicated in Table 4 were produced and herringbone-shaped dynamic pressure grooves were produced by electrochemical machining to make the disk test pieces shown in FIG. 2. A comparison of the dynamic pressure groove finishes was performed. The three types of stainless steel indicated in Table 4 are referred to for the sake of convenience as "DD," "SF20T" and "DHS-1." The disk-shaped test piece made of the DD material was hardened, polished to improve surface roughness, and then electrochemically machined. DHS-1 and SF20T disk test pieces were milled and then electrochemically machined.

and DHS-1 material have sulphur contents of approximately 0.2% and lead content of approximately 0.09%. In contrast, the DD material has a lead content of nearly zero and an extremely low sulphur content (less than one-tenth of SF20T and DHS-1 materials). Therefore, there is virtually no dislodging of sulphur components from the surface after electrochemical machining and almost no dissolution of the lead content, resulting in an improvement of surface roughness.

Figure 14:
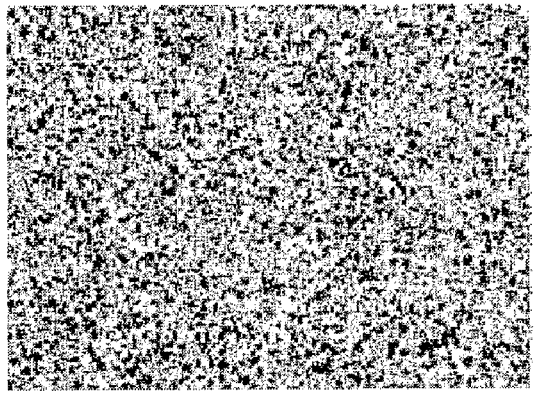
FIG. 14 shows photographs of the surface condition of a test piece prior to electrochemical machining in accordance with the third embodiment of the present invention. Specifically, it shows (clockwise starting with the top left photograph) a photograph of DD material before tempering, a photograph of DD material after tempering, a photograph of SF20T material (raw material), and a photograph of DHS-1 material (raw material).
Figure 14:
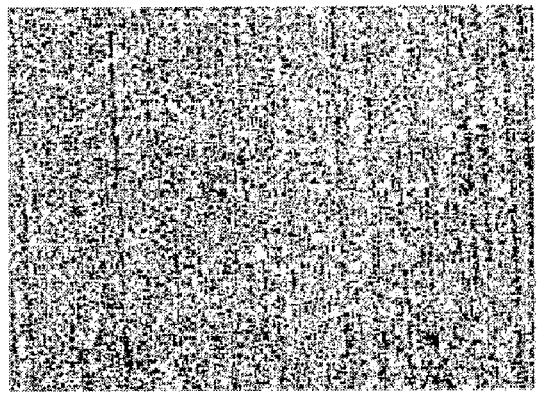
Figure 14:
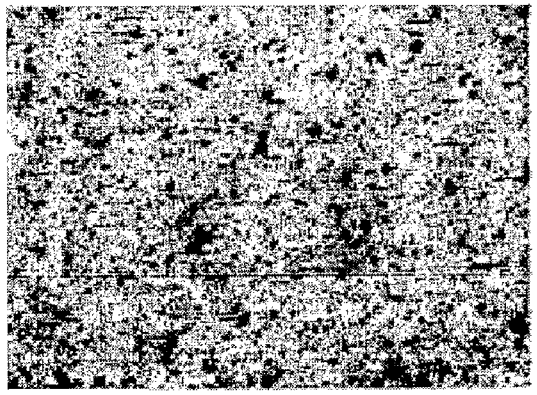
Figure 14:

FIG. 14 constitutes ×100 enlarged photographs of various stainless steel surfaces. As is clear from FIG. 14, the DD material after tempering has the highest degree of fine grain metal structure. On the other hand, since the SF20T and DHS-1 materials cannot be hardened by tempering they were used as-is. In the as-is condition, the grinding stones became loaded and finishing by polishing could not be performed with the result that the blank surface prior to electrochemical machining could not be polished, and it was not possible to improve surface roughness prior to electrochemical machining.

Figure 15A:
FIG. 15A shows a drawing of the profile of the dynamic pressure generating groove of the third embodiment utilizing the DD material.
Figure 15B:
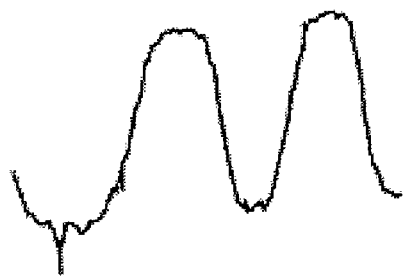
FIG. 15B shows a drawing of the profile of the dynamic pressure generating groove utilizing the SF20T material (comparative example).
Figure 15C:
FIG. 15C shows a drawing of the profile of the dynamic pressure generating groove utilizing the DHS-1 material (comparative example).

FIGS. 15A-C show cross sections (profile) of the herringbone-shaped dynamic pressure grooves formed on the disk-shaped test pieces. FIG. 15A shows the test piece made of the DD material, FIG. 15B shows the test piece made of the SF20T material, FIG. 15C shows the test piece made of the DHS-1 material. As can be seen in FIGS. 15A-C, since dynamic pressure grooves were formed in the DD material test piece by electrochemical machining after obtaining excellent surface roughness after heat treating and polishing, there was little rounding of the corner portions when compared with other test pieces, and it was confirmed that accurate cross-sections were formed. Furthermore, the curve defining the shape of top ridge portions and groove parts was

TABLE 4

| | Material | Chemical Composition (units: weight %) | | | | | | | | | | |
|---|---|---|---|---|---|---|---|---|---|---|---|---|
| | | C | Si | Mn | P | S | Cr | Mo | V | Pb | Ti | O |
| Standard Values | DD | 0.60~0.75 | max. 1.00 | max. 1.00 | max. 0.030 | max. 0.020 | 11.50~13.50 | max. 0.30 | max. 0.15 | — | max. 15 ppm | max. 15 ppm |
| | SF20T | max. 0.05 | max. 1.00 | max. 2.00 | max. 0.050 | min. 0.15 | 19.00~21.00 | 1.50~2.50 | — | — | — | — |
| | DHS-1 | max. 0.03 | max. 1.00 | max. 0.50 | max. 0.050 | min. 0.15 | 18.00~20.00 | 0.10~0.30 | — | — | — | — |
| | SUS440C | 0.95~1.20 | max. 1.00 | max. 1.00 | max. 0.060 | max. 0.03 | 16.00~18.00 | max. 0.75 | — | — | — | — |
| Measured Values | DD | * | * | * | * | 0.002 | * | * | * | 0.000 | * | * |
| | SF20T | * | * | * | * | 0.185 | * | * | * | 0.089 | * | * |
| | DHS-1 | * | * | * | * | 0.204 | * | * | * | 0.091 | * | * |

* No measured valued

The DD material is a martensitic stainless steel with enhanced free cutting properties due to the scarcity of sulphur and the small size of the eutectic carbides compared with typical SUS440C martensitic stainless steel material that can be hardened by tempering and is the material equivalent to that specified in the method claims of this patent application as well as Japanese Patent No. 3613534 by the inventor of this application. DHS-1 and SF20T are ferritic stainless steels with enhanced free cutting properties compared with typical SUS430F ferritic stainless steel material that cannot be hardened by tempering. For reference, Table 4 includes the standard values for the composition of SUS440C material.

As shown in Table 4, compared with DHS-1 material and SF20T material, the DD material used in this embodiment has extremely low sulphur and lead content. The SF20T material smoother compared with other test pieces, indicating that the surface roughness of the finished surfaces was excellent.

The reasons why there was little rounding of the dynamic pressure groove shape in the DD material is explained as follows:

(1) Because there is extremely little lead or sulphur content, it is unlikely that the shape would deteriorate due to preferential dissolution of the lead component or protrusion and dislodging of the sulphur component.

(2) Since there is extremely little lead content, the tendency for selective elution of the boundaries between the top ridge portions and the bottom portions is suppressed, imparting high precision to the shape of the dynamic pressure grooves.

In electrochemical machining, the current density in the elution region directly below the conductive pattern surface of the electrode tool is at its maximum and is constant. All components of the test piece surface corresponding to the conductive pattern surface are removed, thus forming the bottom portions of the dynamic pressure grooves. In the non-eluted regions sufficiently distant from the conducting pattern surface of the electrode tool, the current density is approximately zero with no dissolution of the constituent components, thereby leaving the top ridge portions on the test piece surface. In between the elution and non-elution regions there is a selective elution region where the current density decreases from its maximum value to zero. In the selective elution region, the components with high electrolytic constants are selectively eluted. As a result, we see a phenomenon in which the boundary corners between the bottom portions and the top ridge portions deteriorate (get rounded). Since the lead content of the DD material is virtually zero, this phenomenon does not occur to the degree it does in other materials.

Figure 16A:
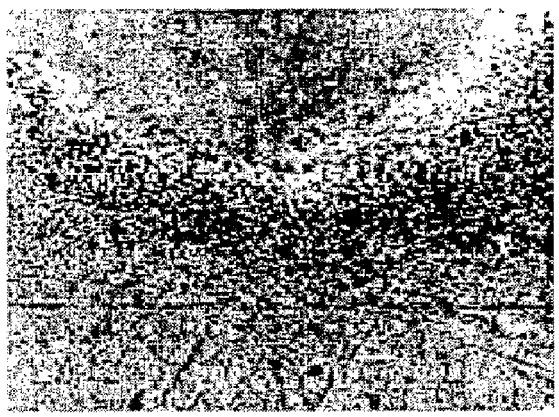
FIG. 16A shows an electron micrograph of an enlarged surface in the vicinity of the boundaries between the top portions of the ridge and the bottom of the groove made of DD material in accordance with the third embodiment.
Figure 16B:
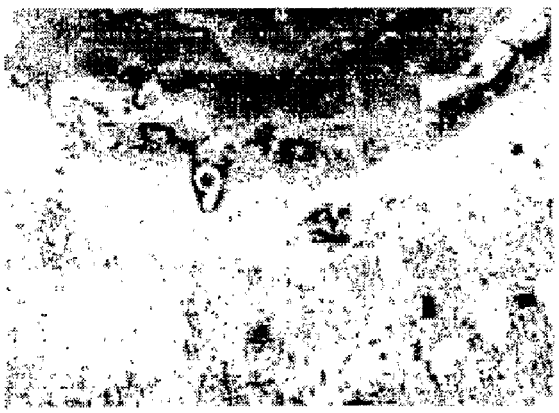
FIG. 16B shows an electron micrograph of an enlarged surface in the vicinity of the boundaries between the top portions of the ridge and the bottom of the groove made of SF20T.
Figure 16C:
FIG. 16C shows an electron micrograph of an enlarged surface in the vicinity of the boundaries between the top portions of the ridge and the bottom of the groove made of DHS-1.
Figure 17:
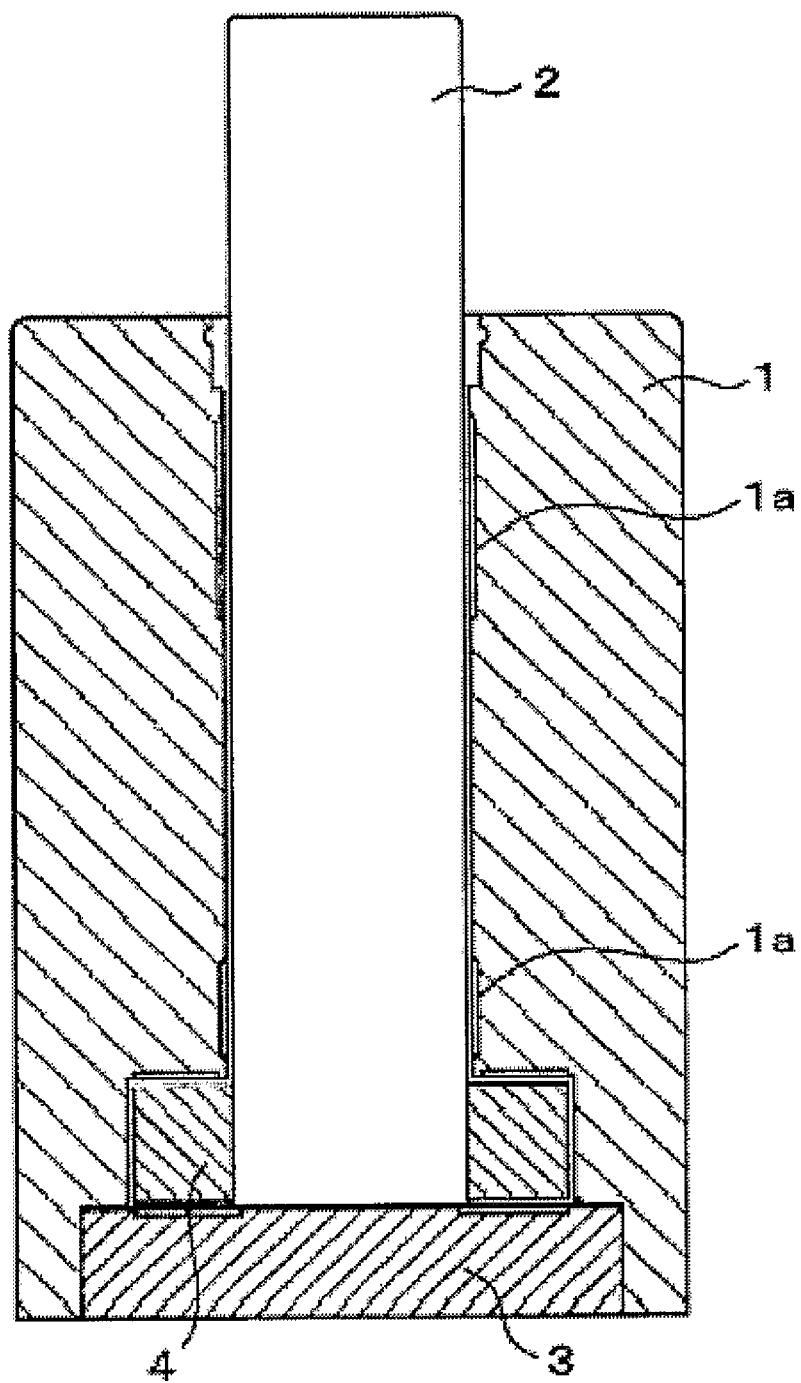
FIG. 17 shows a cross-sectional view of an example of a fluid dynamic bearing of the prior art.

FIGS. 16A-C are electronic micrographs showing plan views of the various dynamic pressure grooves of the test pieces. FIG. 16A shows the test piece made of the DD material, FIG. 16B shows the test piece made of the SF20T material, FIG. 16C shows the test piece made of the DHS-1 material. These photographs are enlargements of the surfaces in the vicinity of the boundaries between the top ridge portions and bottom portions (corresponding to the curved V-shaped portions in FIG. 6). In all of these photographs, the dynamic pressure groove bottom portions are shown at the bottom, the surfaces of the top ridge portions are shown at the top, while the arcuate boundary portions are shown approximately in the middle. The surfaces of the DD material test pieces do not show the inclusions or depressions seen in the other test pieces, and no significant deterioration of the shape of the boundary portions was observed. It is clear that accurately-shaped dynamic pressure grooves were formed.

The advantages of this invention are as follows:
(1) Since the sulphur content is low (0.03 weight % or less), there are few depressions left by dislodging of the sulphur components or protrusions left by sulfide inclusions after electrochemical machining.
(2) Since there is little lead content (under 0.001 weight %), the formation of depressions due to preferential dissolution of the lead content during electrochemical machining can be suppressed.
(3) The quality of surface roughness of the surface that is electrochemically machined is improved due to (1) and (2) above.
(4) The little selective elution due to (2), contributes to the improved precision of the configuration of the dynamic pressure grooves.
(5) Surface roughness after electrochemical machining is improved by tempering and polishing the material prior to electrochemical machining in order to improve the surface roughness of the surface to be electrochemically machined.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

We claim as follows:

1. A fluid dynamic bearing comprising:
a shaft component; and
a bearing sleeve component, said bearing sleeve component and said shaft component being rotatably supported with respect to each other;
wherein at least one of said components is made of steel comprising by weight C: 0.6-1.20%; Si: 1.0% or less; Mn: 1.0% or less; Cr: 10.5-18.0%; Mo: 1.0% or less; S: 0.03% or less; and Fe, and wherein said at least one of said components further comprises a fluid dynamic bearing surface having a plurality of electrochemically machined hydrodynamic pressure generating grooves with raised substantially straight top ridge portions remaining between said grooves,
wherein a profile view of said fluid dynamic bearing surface comprises substantially straight top ridge portions, a substantially straight sloped side portion, and a bottom portion.

2. A fluid dynamic bearing according to claim 1, wherein said steel is stainless steel.

3. A fluid dynamic bearing according to claim 1, wherein said steel is heat treated prior to the electrochemical machining of said hydrodynamic pressure generating grooves.

4. A fluid dynamic bearing according to claim 3, wherein said steel is polished prior to the electrochemical machining of said hydrodynamic pressure generating grooves.

5. A fluid dynamic bearing according to claim 1, wherein said fluid dynamic bearing surface viewed in a perpendicular cross-section further comprises a substantially straight top ridge portion, substantially straight sloped walls and a bottom portion.

6. A fluid dynamic bearing according to claim 5, wherein said substantially straight top ridge portion is connected to said substantially straight sloped walls by substantially arcuate portions, and wherein a length of each of said substantially arcuate portions in a direction parallel to said substantially straight top ridge portion is 20 µm or less, and a length of each of said substantially arcuate portions in a direction parallel to said substantially straight sloped wall is 1.0 µm or less.

7. A fluid dynamic bearing according to claim 5, wherein each of said substantially straight sloped walls has a length, said length being 75%-90% of a length of a line segment tangential to said substantially straight sloped wall and cut by a line tangential to said substantially straight top ridge portion and a line tangential to a deepest point of a corresponding groove.

8. A fluid dynamic bearing according to claim 1, wherein surface roughness of said raised top ridge portions is Ra 0.11 µm or less.

9. A fluid dynamic bearing according to claim 1, wherein a variation in depths of said pressure generating grooves is 0.4 µm or less.

10. A fluid dynamic bearing according to claim 1, wherein said steel further comprises by weight Pb: 0.001% or less, as an unavoidable impurity.

11. A fluid dynamic bearing according to claim 1 further comprising an end plate enclosing said bearing sleeve component, said end plate having a fluid dynamic bearing surface having a plurality of electrochemically machined hydrodynamic pressure generating grooves with raised top ridge portions remaining between said grooves.

12. A fluid dynamic bearing according to claim 11, wherein said end plate is made of steel comprising by weight C: 0.6-1.20%; Si: 1.0% or less; Mn: 1.0% or less; Cr: 10.5-18.0%; Mo: 1.0% or less; S: 0.03% or less; and Fe.

13. A fluid dynamic bearing according to claim 12, wherein said steel further comprises by weight Pb: 0.001% or less, as an unavoidable impurity.

14. A spindle motor having a fluid dynamic bearing, said spindle motor comprising:
a motor base;
a bearing sleeve fixedly secured to said motor base;
a stator secured to said motor base;
a rotating shaft, said rotating shaft being rotatably supported with respect to said bearing sleeve;
a rotor hub mounted on said rotating shaft; and
a rotor magnet secured to said rotor hub, said rotor magnet working together with said stator to generate a rotating magnetic field,
wherein at least one of said rotating shaft and said bearing sleeve is made of steel comprising by weight C: 0.6-1.20%; Si: 1.0% or less; Mn: 1.0% or less; Cr: 10.5-18.0%; Mo: 1.0% or less; S: 0.03% or less; and Fe, and wherein said at least one of said rotating shaft and said bearing sleeve further comprises a fluid dynamic bearing surface having a plurality of electrochemically machined hydrodynamic pressure generating grooves with raised substantially straight top ridge portions remaining between said grooves,
wherein a profile view of said fluid dynamic bearing surface comprises substantially straight top ridge portions, a substantially straight sloped side portion, and a bottom portion.

15. A spindle motor according to claim 14, wherein said steel is stainless steel.

16. A spindle motor according to claim 14, wherein said steel is heat treated prior to the electrochemical machining of said hydrodynamic pressure generating grooves.

17. A Spindle motor according to claim 16, wherein said steel is polished prior to the electrochemical machining of said hydrodynamic pressure generating grooves.

18. A spindle motor according to claim 14, wherein said fluid dynamic bearing surface viewed in a perpendicular cross-section further comprises a substantially straight top ridge portion, substantially straight sloped walls and a bottom portion.

19. A spindle motor according to claim 18, wherein said substantially straight top ridge portion is connected to said substantially straight sloped walls by substantially arcuate portions, and wherein a length of a line segment tangential to said substantially straight sloped wall and cut by a line tangential to said substantially straight top ridge portion and a line tangential to a deepest point of a corresponding groove.

20. A spindle motor according to claim 18, wherein each of said substantially straight sloped walls has a length, said length being 75%-90% of a length of a line segment tangential to said substantially straight sloped wall and cut by a line tangential to said substantially straight top ridge portion and a line tangential to a deepest point of a corresponding groove.

21. A spindle motor according to claim 14, wherein surface roughness of said raised top ridge portions is Ra 1.0 μm or less.

22. A spindle motor according to claim 14, wherein a variation in depths of said pressure generating grooves is 0.4 μm or less.

23. A spindle motor, according to claim 14, wherein said steel further comprises by weight Pb: 0.001% or less, as an unavoidable impurity.

24. A spindle motor according to claim 14, further comprising an end plate enclosing said bearing sleeve component, said end plate having a fluid dynamic bearing surface having a plurality of electrochemically machined hydrodynamic pressure generating grooves with raised top ridge portions remaining between said grooves.

25. A spindle motor according to claim 24, wherein said end plate is made of steel comprising by weight C: 0.6-1.20%; Si: 1.0% or less; Mn: 1.0% or less; Cr: 10.5-18.0%; Mo: 1.0% or less; S: 0.03% or less; and Fe.

26. A spindle motor according to claim 25, wherein said steel further comprises by weight Pb: 0.001% or less, as an unavoidable impurity.

27. A spindle motor having a fluid dynamic bearing, said spindle motor comprising: a motor base;
a fixed shaft mounted on said motor base;
a stator secured to said motor base;
a rotating bearing sleeve, said rotating bearing sleeve being rotatably supported with respect to said fixed shaft;
a rotor hub mounted on said rotating bearing sleeve; and
a rotor magnet secured to said rotor hub, said rotor magnet working together with said stator to generate a rotating magnetic field,
wherein at least one of said fixed shaft and said rotating bearing sleeve is made of steel comprising by weight C: 0.6-1.20%; Si: 1.0% or less; Mn: 1.0% or less; Cr: 10.5-18.0%; Mo: 1.0% or less; S: 0.03% or less; and Fe, and wherein said at least one of said fixed shaft and said rotating bearing sleeve further comprises a fluid dynamic bearing surface having a plurality of electrochemically machined hydrodynamic pressure generating grooves with raised substantially straight top ridge portions remaining between said grooves,
wherein a profile view of said fluid dynamic bearing surface comprises substantially straight top ridge portions, a substantially straight sloped side portion, and a bottom portion.

28. A spindle motor according to claim 27, wherein said steel is stainless steel.

29. A spindle motor according to claim 27, wherein said steel is heat treated prior to the electrochemical machining of said hydrodynamic pressure generating grooves.

30. A spindle motor according to claim 29, wherein said steel is polished prior to the electrochemical machining of said hydrodynamic pressure generating grooves.

31. A spindle motor according to claim 27, wherein said fluid dynamic bearing surface viewed in a perpendicular cross-section further comprises a substantially straight top ridge portion, substantially straight sloped walls and a bottom portion.

32. A spindle motor according to claim 31, wherein said substantially straight top ridge portion is connected to said substantially straight sloped walls by substantially arcuate portions, and wherein a length of a line segment tangential to said substantially straight sloped wall and cut by a line tangential to said substantially straight top ridge portion and a line tangential to a deepest point of a corresponding groove.

33. A spindle motor according to claim 31, wherein each of said substantially straight sloped walls has a length, said length being 75%-90% of a length of a line segment tangential to said substantially straight sloped wall and cut by a line tangential to said substantially straight top ridge portion and a line tangential to a deepest point of a corresponding groove.

34. A spindle motor according to claim 27, wherein surface roughness of said raised top ridge portions is Ra 1.0 μm or less.

35. A spindle motor according to claim 27, wherein a variation in depths of said pressure generating grooves is 0.4 µm or less.

36. A spindle motor according to claim 27, wherein said steel further comprises by weight Pb: 0.001% or less, as an unavoidable impurity.

37. A spindle motor according to claim 27, further comprising an end plate enclosing said bearing sleeve component, said end plate having a fluid dynamic bearing surface having a plurality of electrochemically machined hydrodynamic pressure generating grooves with raised top ridge portions remaining between said grooves.

38. A spindle motor according to claim 37, wherein said end plate is made of steel comprising by weight C: 0.6-1.20%; Si: 1.0% or less; Mn: 1.0% or less; Cr: 10.5-18.0%; Mo: 1.0% or less; S: 0.03% or less; and Fe.

39. A spindle motor according to claim 38, wherein said steel further comprises by weight Pb: 0.001% or less, as an unavoidable impurity.

40. A disk drive storage device comprising:
a spindle motor having a fluid dynamic bearing, said spindle motor including
a motor base;
a fixed shaft mounted on said motor base;
a stator secured to said motor base;
a rotating bearing sleeve, said rotating bearing sleeve being rotatably supported with respect to said fixed shaft;
a rotor hub mounted on said rotating bearing sleeve; and
a rotor magnet secured to said rotor hub, said rotor magnet working together with said stator to generate a rotating magnetic field;
a storage disk mounted for rotation on said rotor hub of said spindle motor; and a data head executing read/write operations on said storage disk,
wherein at least one of said fixed shaft and said rotating bearing sleeve is made of steel comprising by weight C: 0.6-1.20%; Si: 1.0% or less; Mn: 1.0% or less; Cr: 10.5-18.0%; Mo: 1.0% or less; S: 0.03% or less; and Fe, and wherein said at least one of said fixed shaft and said rotating bearing sleeve further comprises a fluid dynamic bearing surface having a plurality of electrochemically machined hydrodynamic pressure generating grooves with raised substantially straight top ridge portions remaining between said grooves,
wherein a profile view of said fluid dynamic bearing surface comprises substantially straight top ridge portions, a substantially straight sloped side portion, and a bottom portion.

41. A disk drive storage device according to claim 40, wherein said steel is stainless steel.

42. A disk drive storage device according to claim 40, wherein said steel is heat treated prior to the electrochemical machining of said hydrodynamic pressure generating grooves.

43. A disk drive storage device according to claim 42, wherein said steel is polished prior to the electrochemical machining of said hydrodynamic pressure generating grooves.

44. A disk drive storage device according to claim 40, wherein said fluid dynamic bearing surface viewed in a perpendicular cross-section further comprises a substantially straight top ridge portion, substantially straight sloped walls and a bottom portion.

45. A disk drive storage device according to claim 44, wherein said substantially straight top ridge portion is connected to said substantially straight sloped walls by substantially arcuate portions, and wherein a length of a line segment tangential to said substantially straight sloped wall and cut by a line tangential to said substantially straight top ridge portion and a line tangential to a deepest point of a corresponding groove.

46. A disk drive storage device according to claim 44, wherein each of said substantially straight sloped walls has a length, said length being 75%-90% of a length of a line segment tangential to said substantially straight sloped wall and cut by a line tangential to said substantially straight top ridge portion and a line tangential to a deepest point of a corresponding groove.

47. A disk drive storage device according to claim 40, wherein surface roughness of said raised top ridge portions is Ra 1.0 µm or less.

48. A disk drive storage device according to claim 40, wherein a variation in depths of said pressure generating grooves is 0.4 µm or less.

49. A disk drive storage device according to claim 40, wherein said steel further comprises by weight Pb: 0.001% or less, as an unavoidable impurity.

50. A disk drive storage device according to claim 40, wherein said spindle motor further comprises an end plate enclosing said bearing sleeve component, said end plate having a fluid dynamic bearing surface having a plurality of electrochemically machined hydrodynamic pressure generating grooves with raised top ridge portions remaining between said grooves.

51. A disk drive storage device according to claim 50, wherein said end plate is made of steel comprising by weight C: 0.6-1.20%; Si: 1.0% or less; Mn: 1.0% or less; Cr: 10.5-18.0%; Mo: 1.0% or less; S: 0.03% or less; and Fe.

52. A disk drive storage device according to claim 51, wherein said steel further comprises by weight Pb: 0.001% or less, as an unavoidable impurity.

53. A disk drive storage device comprising:
a spindle motor having a fluid dynamic bearing, said spindle motor including
a motor base;
a bearing sleeve fixedly secured to said motor base;
a stator secured to said motor base;
a rotating shaft, said rotating shaft being rotatably supported with respect to said bearing sleeve;
a rotor hub mounted on said rotating shaft; and
a rotor magnet secured to said rotor hub, said rotor magnet working together with said stator to generate a rotating magnetic field,
a storage disk mounted for rotation on said rotor hub of said spindle motor; and a data head executing read/write operations on said storage disk,
wherein at least one of said rotating shaft and said bearing sleeve is made of a steel comprising by weight C: 0.6-1.20%; Si: 1.0% or less; Mn: 1.0% or less; Cr: 10.5-18.0%; Mo: 1.0% or less; S: 0.03% or less; and Fe, and wherein said at least one of said rotating shaft and said bearing sleeve further comprises a fluid dynamic bearing surface having a plurality of electrochemically machined hydrodynamic pressure generating grooves with raised substantially straight top ridge portions remaining between said grooves,
wherein a profile view of said fluid dynamic bearing surface comprises substantially straight top ridge portions, a substantially straight sloped side portion, and a bottom portion.

54. A disk drive storage device according to claim 53, wherein said steel is stainless steel.

55. A disk drive storage device according to claim 53, wherein said steel is heat treated prior to the electrochemical machining of said hydrodynamic pressure generating grooves.

56. A disk drive storage device according to claim 55, wherein said steel is polished prior to the electrochemical machining of said hydrodynamic pressure generating grooves.

57. A disk drive storage device according to claim 53, wherein said fluid dynamic bearing surface viewed in a perpendicular cross-section further comprises a substantially straight top ridge portion, substantially straight sloped walls and a bottom portion.

58. A disk drive storage device according to claim 57, wherein said substantially straight top ridge portion is, connected to said substantially straight sloped walls by substantially arcuate portions, and wherein a length of a line segment tangential to said substantially straight sloped wall and cut by a line tangential to said substantially straight top ridge portion and a line tangential to a deepest point of a corresponding groove.

59. A disk drive storage device according to claim 57, wherein each of said substantially straight sloped walls has a length, said length being 75%-90% of a length of a line segment tangential to said substantially straight sloped wall and cut by a line tangential to said substantially straight top ridge portion and a line tangential to a deepest point of a corresponding groove.

60. A disk drive storage device according to claim 53, wherein surface roughness of said raised top ridge portions is Ra 1.0 µm or less.

61. A disk drive storage device according to claim 53, wherein a variation in depths of said pressure generating grooves is 0.4 µm or less.

62. A disk drive storage device according to claim 53, wherein said steel further comprises by weight Pb: 0.001% or less, as an unavoidable impurity.

63. A disk drive storage device according to claim 53, wherein said spindle motor further comprises an end plate enclosing said bearing sleeve component, said end plate having a fluid dynamic bearing surface having a plurality of electrochemically machined hydrodynamic pressure generating grooves with raised top ridge portions remaining between said grooves.

64. A disk drive storage device according to claim 63, wherein said end plate is made of steel comprising by weight C: 0.6-1.20%; Si: 1.0% or less; Mn: 1.0% or less; Cr: 10.5-18.0%; Mo: 1.0% or less; S: 0.03% or less; and Fe.

65. A disk drive storage device according to claim 64, wherein said steel further comprises by weight Pb: 0.001% or less, as an unavoidable impurity.

66. A method for manufacturing of a fluid dynamic bearing having a shaft component and a bearing sleeve component, said method comprising the steps of:

forming at least one component of said fluid dynamic bearing of a steel comprising by weight C: 0.6-1.20%; Si: 1.0% or less; Mn: 1.0% or less; Cr: 10.5-18.0%; Mo: 1.0% or less; S: 0.03% or less; and Fe, said steel further having eutectic carbon particles of 10 µm or less in diameter;

heat treating said at least one component by tempering and annealing;

polishing said heat treated component; and electrochemically machining said heat treated and polished component to form a plurality of hydrodynamic pressure generating grooves with raised substantially straight top ridge portions remaining between said grooves, wherein a profile view of said fluid dynamic bearing surface comprises substantially straight top ridge portions, a substantially straight sloped side portion, and a bottom portion.

67. A method for manufacturing of a fluid dynamic bearing according to claim 66, wherein said steel further comprises by weight Pb: 0.001% or less, as an unavoidable impurity.

* * * * *